March 21, 1961  E. F. D'ALOISIO ET AL  2,975,876
INFEED ATTACHMENT FOR A MACHINE TOOL
Filed Aug. 27, 1956  4 Sheets-Sheet 3

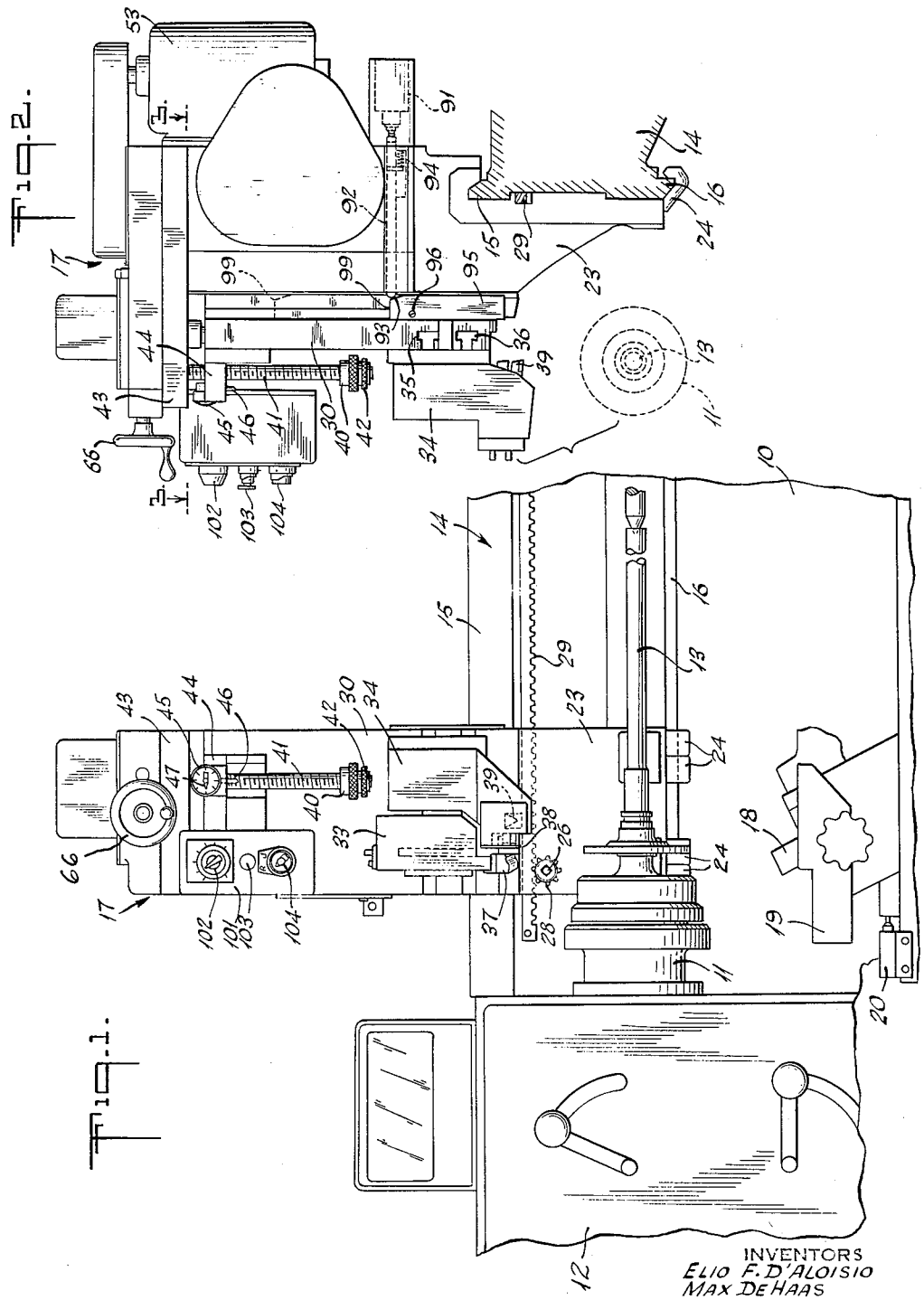

INVENTORS
ELIO F. D'ALOISIO
MAX DE HAAS
BY Mitchell & Beshert
ATTORNEYS

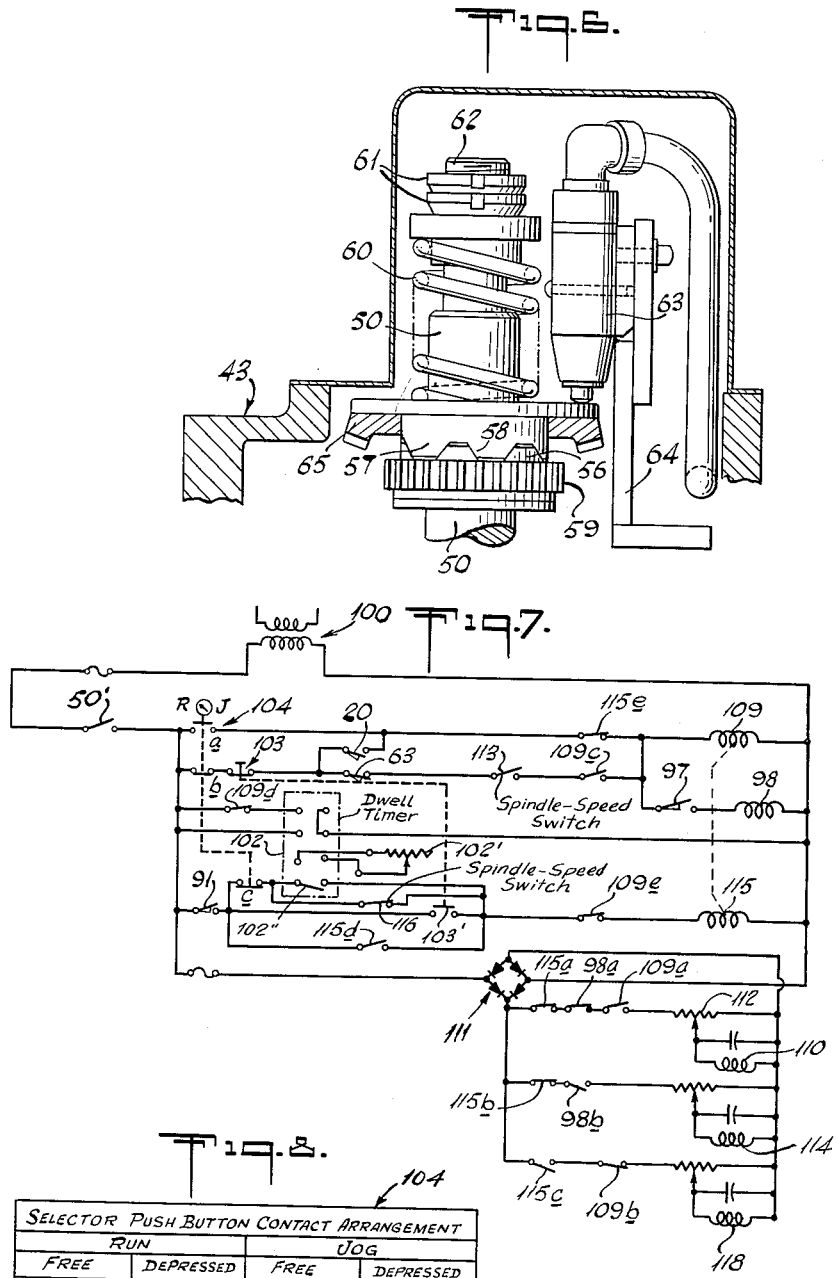

United States Patent Office 2,975,876
Patented Mar. 21, 1961

2,975,876

INFEED ATTACHMENT FOR A MACHINE TOOL

Elio F. D'Aloisio, East Hartford, Conn., and Max De Haas, Grosse Point Park, Mich., assignors to The New Britain Machine Company, New Britain, Conn., a corporation of Connecticut Filed Aug. 27, 1956, Ser. No. 606,238

2 Claims. (Cl. 192—150)

This invention relates to a slide attachment for a machine tool, as of the character which may be adjustably clamped to the longitudinal ways of a lathe; the invention is particularly concerned with such slides for the performance of in-feed or cross-slide functions.

It is an object of the invention to provide an improved device of the character indicated.

It is another object to provide a device of the character indicated, particularly adaptable to a copying lathe and having features of operation completely independent of or integrated with any part of the cycle of the lathe, as may be desired.

Another object is to provide a device of the character indicated which is capable of taking heavy radial plunging or facing cuts and at the same time working to close tolerances.

A further object is to provide a device of the character indicated, wherein the feed mechanism automatically retracts the tools from the work whenever an undesirable load condition occurs.

It is a specific object to achieve the above-indicated objects with mechanism incorporating overload-responsive means which will protect the drive against damage, whether the overload condition occurs in the forward or in the retracting phase of tool movement.

It is another specific object to meet the above objects with a slide construction in which the same overload-responsive mechanism may serve to determine maximum forward-feed position of the tools and also to protect the mechanism in the event overload conditions are encountered prior to attainment of full-feed position, as in the case when the tools become dull.

Other objects and various further features of novelty and invention will be pointed out and will occur to those skilled in the art from a reading of the following specification in conjunction with the accompanying drawings. In said drawings, which show for illustrative purposes only, a preferred form of the invention:

Fig. 1 is a fragmentary view in front elevation of a lathe, such as a copying lathe, to which a slide attachment of our invention has been applied;

Fig. 2 is a fragmentary side view of the attachment of Fig. 1;

Fig. 6 is an enlarged fragmentary view in vertical elevation of certain of the parts shown at the top left portion of Fig. 4, said parts being shown in section in the same plane as that depicted in Fig. 4, so as to reveal the nature of internal mechanism;

Fig. 7 is a switching-circuit diagram showing control elements for the mechanism of Figs. 1 to 6; and Fig. 8 is a diagram of contact arrangements for an element of Fig. 7.

Figure 3:
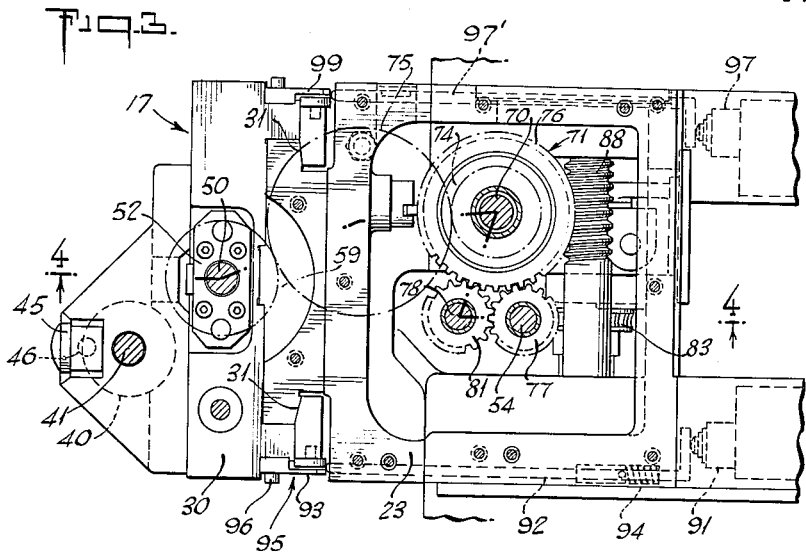
Fig. 3 is an enlarged view, taken essentially in a section designated by the line 3—3 in Fig. 2.

Briefly stated, our invention relates to a slide attachment for a machine tool, such as a copying lathe, the attachment being conveniently adapted for adjustably mounting along the ways of the machine in a manner to perform in-feed or cross-slide functions. The mechanism is completely contained in the slide attachment and it incorporates provision for rapid or jump feed of the slide, followed by slow or cutting feed, and finally by rapid retraction. Means are provided for assuring that the drive load shall never exceed a predetermined threshold, and the arrangement is such that if the tools should become dull, the mechanism is automatically thrown into reverse so as to retract the slide and, if desired, shut down the recycling function. Means are also provided for precisely determining the limiting forward feed position of the slide and for effecting automatic reversal of slide movement upon achievement of this position. The safety features of the device avoid overloading the drive mechanism regardless of the direction of the slide movement, should drive torques in excess of a pre-selected threshold be encountered.

Referring to Figs. 1 and 2 of the drawings, our invention is shown in application to a copying lathe 10 of the so-called Fischer type, as disclosed in greater detail in various Von Zelewski patents, such as Patent No. 2,695,543. For present purposes, it suffices to say that the machine 10 includes a spindle 11 driven by works within a power case 12, whereby a piece of work 13 may be supported for continuous rotation. The frame of the machine includes an elongated member 14 generally behind and extending above the plane of support of the work 13, and it is on ways 15—16 of the frame member 14 that we support our slide attachment 17. As far as the more conventional functions of the machine 10 are concerned, it suffices to say that the machine includes means for supporting one or more tools generally below the workpiece 13 and mechanism for radial advance and retraction of the tool 18, while a slide 19 is traversed along the workpiece, all in accordance with the probing of a master profile (not shown). For performing automatic recycling operations, the machine 10 may include program means including a cycle-start switch 20, adjustably mounted on the machine frame and momentarily operated by slide 19 at a predetermined point of leftward traverse; switch 20 is closed only momentarily by the slide 19 at the end of its cutting stroke and is opened immediately on carriage reversal.

The slide attachment 17 comprises a frame member 23 based on the ways 15—16 and including provision, as at hook bolts 24, for clamping the same against the frame 14 in a selected longitudinal position thereof. To assist in longitudinally positioning the frame member 23, a handcrank 25 (see Fig. 4) may be removably engaged to the head 26 of a shaft 27 carrying a pinion 28. The pinion 28 engages an elongated rack 29 secured to and forming part of the frame 14.

A tool-slide member 30 is reciprocably guided in ways 31 on the frame member 23 and, in the arrangement shown, this amounts to limiting the slide 30 to vertical movement above the plane of support of the workpiece 13. The tool holders 33—34 are shown secured in mounting dovetailed slots 35—36 in the slide 30 and, for the particular arrangement shown, cutting tools 37—38—39 are carried thereby.

In accordance with a feature of the invention, the slide attachment 17 incorporates its own automatic drive mechanism, including provision for shutting down and reversing the feed in the event that overload conditions are encountered. The feed mechanism also provides for rapid or jump feed of the slide 30 to the vicinity of cutting action on the work, and for automatic transfer from jump to slow feed drive until completion of the cutting stroke.

Cutting advance is limited by direct abutment of coacting parts carried by the slide and by the frame. In the form shown, these parts are adjustable so as to enable some flexibility in set-up in the machine. The abutment part carried by the frame is a stop nut 40 adjustably positioned on a threaded rod 41 and locked by means 42 in the adjusted position. The rod 41 is anchored in an overhanging or cantilevered part 43 of the frame 23. The stop-abutment part carried by the slide is a heavy lug or bracket 44 having an opening through which the rod 41 passes.

The parts are shown in the drawings in the fully retracted condition, but it will be appreciated that, at the full-forward feed position of the slide 30, the abutment 44 carried thereby will directly engage the stop nut 40. If desired, indicator means 45 having an exposed probe member 46 (to engage a part of nut 40) may be carried by the bracket 44, so that the needle 47 thereof may clearly indicate to the operator the exact relation of the parts every time the slide is fed to the full-forward position. The desired depth of cut may thus be monitored directly.

The specific means for feeding the slide is shown to comprise a lead screw 50 firmly journaled in thrust bearing means 51 in the overhanging part 43 of the frame. A nut 52 continuously rides the lead screw and is anchored to the slide 30. Basic drive for the lead screw is derived from a continuously rotating motor 53, shown mounted on the back side of the frame 23 and shown running a drive shaft 54 by way of a belt connection 55.

In accordance with the invention, all possible connections between the drive shaft 54 and the lead screw 50 include a torque-limiting device, whereby no more than a preselected torque amplitude may ever be transmitted from the drive shaft 54 to the lead screw 50. This connection is such that torque is limited regardless of direction of drive of the lead screw 50. In the form shown, the torque-limiting device comprises clutch elements 56—57 (Fig. 6) having interengaging teeth with cam-slope surfaces 58 designed to produce a longitudinal separation of the parts 56—57 upon development of excessive torque between the driving and driven elements. In the form shown, the driving element is the member 56, the cam teeth of which are formed on the hub of a gear 59 directly connected to the drive mechanism. The driven element 57 is keyed to the lead-screw shaft 50 and is permitted some degree of longitudinal freedom on the shaft 50. A compression spring 60 is loaded by adjustable means 61 against the driven member 57 so as to determine a threshold of torque beyond which the elements 56—57 will be cammed out of engagement, so as in effect to disengage drive from gear 59 to the lead-screw shaft 50. The means 61 may be lock nuts on the threaded end 62 of the lead-screw shaft 50 so as to provide selective adjustment of limiting torque. A limit switch 63 is mounted on the frame (by means of a bracket 64) and probes the back side of the driven element 57 for possible longitudinal displacement. The switch 63 is normally closed, but upon development of overload torque, switch 63 is operated to open its contacts.

Figure 4:
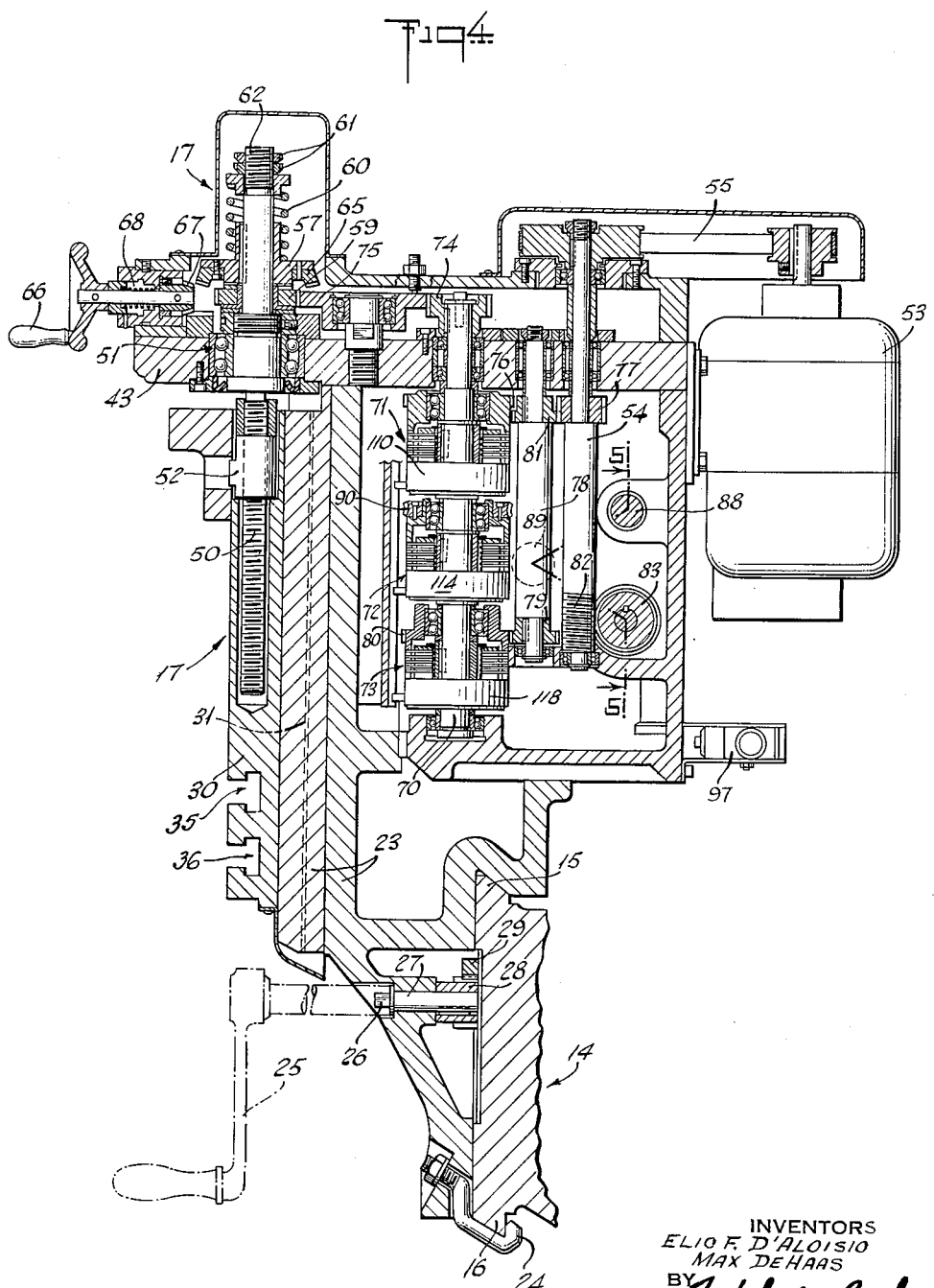
Fig. 4 is a vertical sectional view, developed essentially along the line 4—4 of Fig. 3.

In the form shown, the driven element 57 is formed as the hub of a beveled gear 65 used for manually positioning the slide 30, as when setting up the tools. In Fig. 4, this mechanism is seen to comprise a hand wheel 66 driving a beveled pinion 67, which may be depressed to mesh with the beveled gear 65; spring means 68 normally urges the pinion 67 and gear 65 out of engagement.

Basic drive to the lead screw 50 by way of the gear 59 is achieved through a clutch shaft 70 having keyed thereto the follower elements of three standard magnetic clutches—a rapid-approach clutch 71, a slow-speed or feed clutch 72, and a rapid-return or retraction clutch 73; the clutches 71—72—73 are shown to be of the solenoid-operated multiple-disc variety, the respective solenoids being designated 110—114—118 in Fig. 7. A pinion 74 on the clutch shaft 70 transmits the selected drive to the gear 59 by way of an idler 75.

The driving elements or cups of the clutches 71—72—73 are each continuously engaged to the drive shaft 54. The clutch cup for the rapid-approach clutch 71 includes a peripheral gear 76 continuously meshing with a broad-tooth pinion 77 on the drive shaft 54, thus determining the necessary high-speed rotation for a rapid-approach feed, should the clutch 71 be engaged. An intermediate shaft 78 carries a pinion 79 constantly meshing with the peripheral gear 80 of the clutch cup of the rapid-return clutch 73, and a further pinion 81 on the intermediate shaft 78 continuously picks off from pinion 77 the same drive speed to gear 80 as for the case of drive to gear 76, the difference being, of course, that drive to the rapid-return clutch gear 80 is in the opposite or reverse direction.

Figure 5:
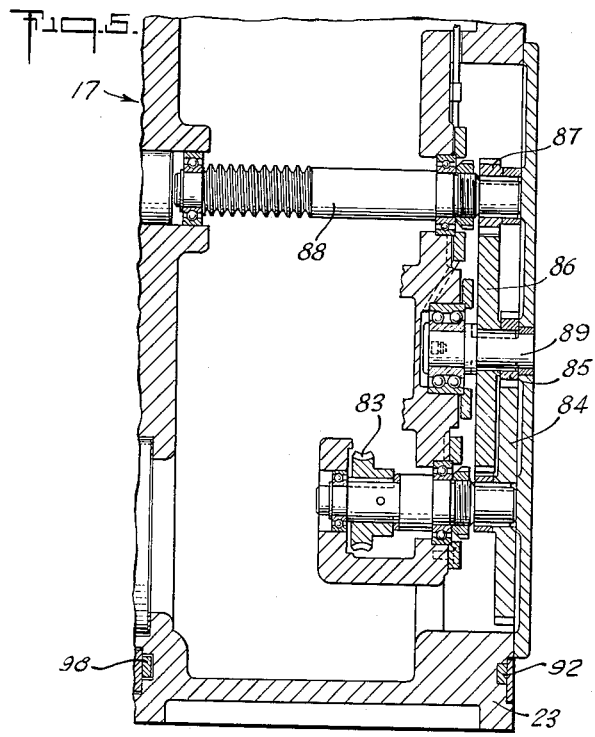
Fig. 5 is another developed sectional view, taken substantially along the line 5—5 of Fig. 4.

The slow-speed or feed pick-off from the drive shaft 54 is accomplished at the worm engagement 82—83 and proceeds through first and second sets of change gears 84—85 and 86—87 (Fig. 5) to a driven worm shaft 88, by way of an idler shaft 89. The worm 88 will be understood to be in constant mesh with the worm wheel 90 carried by the clutch cup for the feed clutch 72.

To complete the mechanical structure, provision is made for safety interlock of certain parts by way of limit switches. A first safety or stop limit switch 91 is mounted on the back end of the frame 23 and to one side (see Fig. 3). This switch is normally open and is actuated by displacement of a slide bar 92, following cam and stop elements 93 carried by the slide 30. A spring 94 serves continuously to urge the slide bar 92 or cam follower in the direction of tracking the cam 93. The cam 93 is formed at the back end of an adjustable plate 95 secured to the side of the slide 30, as by means 96. For the arrangement shown in Figs. 2 and 3, the slide is fully retracted and the bar 92 has been engaged by the cam 93, so as to cause actuation of the switch 91 and therefore a closing of its contacts. As soon as feed starts, the slide 30 (and with it cam plate 95) will advance out of region of contact with follower bar 92, and the limit switch 91 will be opened.

On the other side of the back of the frame 23 is shown a second limit switch 97, which may also be of the normally open variety and actuated by a follower bar 97′ tracking a cam 99 carried by the slide 30, in a manner analogous to that described for the case of the cam 93 and follower 92. The only difference is that the cam 99 is mounted to actuate switch 97 at a different longitudinal position of the slide 30, said different longitudinal position being that which determines the limit of jump feed and transfer to the slow or cutting feed for the slide 30. The relative positions of cams 93—99 are best observed in Fig. 2.

Basic cycling and recycling control of our machine develops from operation of switches 20—63—91—97, connected as in the circuit of Fig. 7. This circuit derives its supply from a transformer 100 and is readied for operation upon closure of switch 50′, which may be one of the contacts of a relay operated as long as the in-feed motor 53 is running. Solenoids 110—114—118 are associated with the jump or rapid-feed clutch 71, with the slow-speed or feed clutch 72, and with the rapid-reverse or retraction clutch 73, respectively; in the form shown, a rectifier 111 serves these solenoids. Operation of solenoids 110—114—118 is governed by corresponding relays 109—98—115 having plural contacts designated by superscript letters, relays 109—115 being interlocked as suggested by a dashed interconnection line. Safety interlock with spindle rotation is achieved at normally open contacts 113 and at normally closed contacts 116, which will be understood to assume closed and open positions respectively, as long as the spindle 11 is running. Relay contacts are shown in their normal (i.e. unactuated) position.

The only exposed electrical controls can be mounted on a simple panel 101. Among these is manually adjustable means 102 for selecting an electrically determined delay interval to establish a dwell of slide 30 at the end of its forward-feed position. A safety push button having normally closed contacts 103 and normally open contacts 103′ enables the operator to reverse the drive connections and retract slide 30 at any time. Finally, control selection is determined by a combined selector switch and push button 104, which permits the operator to select a "run" or a "jog" condition of the machine; the legends "R" and "J" identify a desired selection, and upon inwardly depressing the selector, one or the other of the selected operations is initiated. In Figs. 1 and 7, the selector is shown as having been positioned for the "R" or "run" condition. Fig. 8 tabulates contact arrangements for the selector 104, for the contacts $a$, $b$, and $c$, thereof.

In a typical operating cycle of the machine, slide 30 is advanced down in successive stages of rapid advance, slow feed, dwell at end of feed, and rapid retraction. To jog slide 30 down, selector 104 is turned to the Jog ("J") position and is depressed; the slide is stopped by releasing selector 104, and button 103 is pressed to retract the slide 30. To start an automatic cycle, selector 104 is turned to the Run ("R") position and is depressed and released (after follower 92 clears cam 93); the slide 30 will then go through the feed cycle and will automatically retract upon actuation of switch 63 at an appropriate phase of the traverse program for the slide 19. During any part of the automatic cycle, slide 30 may be retracted immediately, merely by pressing the "Up" button 103.

More specifically, automatic operation proceeds as follows. When the "Run-Jog" selector push button 104 is set on "Run" ("R"), the infeed cycle is initiated when limit switch 20 is closed by the tool slide or carriage 19. Closure of switch 20 energizes relay coil 109 which is interlocked through the normally closed contacts of torque-overload limit switch 63. With operation of relay 109, a normally open contact 109a thereof closes to energize the solenoid 110 of "Rapid-Down" clutch 71; potentiometer 112 may be set for optimum operating level of solenoid 110. The slide 30 descends rapidly, immediately releasing limit switch 91 and eventually closing limit switch 97, the latter remaining closed until slide 30 returns upward past this operating point.

Limit switch 97 energizes relay 98 via contacts 109c and therefore only when relay 109 is energized. At the same time, a normally closed contact 98a of relay 98 opens to de-energize the "Rapid-Down" clutch 71, while a normally open contact 98b of relay 98 closes (preferably after a predetermined delay inherent in the particular relay 98) to energize the solenoid 114 of "Feed" clutch 72.

Slide 30 then descends slowly (i.e. at the feed rate) until striking abutment 40, at which time limit switch 63 is opened, thus de-energizing relay 98 as well as relay 109. This in turn de-energizes the solenoid 115 for "Feed" clutch 72 and stops further descent of the slide 30. Upon drop-out of relay 109, a normally closed contact 109d thereof closes to energize the delay-timing relay 102; thus, after a timed interval (determined by adjustment at 102′), relay 115 is energized through the timed closing contacts 102″ of timer 102 and the previously closed contacts of limit switch 91. Normally open contacts 115c and 115d of relay 115 close to energize the solenoid 118 of "Rapid Up" clutch 73 and to hold-in the circuit to relay 115. Slide 30 then ascends rapidly until it opens limit switch 91, thus dropping out relay 115, which in turn de-energizes the "Rapid Up" clutch and stops slide movement in the up position. The infeed cycle repeats when limit switch 63 is again operated on the next leftward traverse of the carriage or slide 19.

As a safety feature, normally open contacts 113 and normally closed contacts 116 reflect spindle rotation and cause the in-feed mechanism to retract immediately should the spindle stop rotating. Contacts 113—116 will be understood to be part of suitable safety-interlock device, following spindle rotation, and operative to actuate said contacts from their "normal" conditions to their "actuated" positions upon achievement of a spindle speed which has been predetermined to be a safe minimum operating speed; failure to maintain this speed means that contacts 113—116 will return to their "normal" conditions.

It will be seen that we have described an improved in-feed or cross-slide mechanism particularly adapted for attachment to an automatic lathe or the like. The device is readily detachable and adjustable and yet may be operated independent of or integrated with any part of the cycle of the lathe. Because of the torque-limiting feature, the device is capable of taking extremely heavy radial plunging or facing cuts, and at the same time, it can work to close tolerances. The overload-responsive means serves not only to automatically and accurately control sizes but also to disengage tools from the work and return the slide 30 to starting position whenever overload conditions are encountered. The device inherently protects the drive mechanism against damage if overload is encountered in either direction of slide travel.

While we have described the invention in detail for the preferred form shown, it will be understood that modifications may be made within the scope of the invention as defined in the claims which follow.

We claim:

1. As an article of manufacture, a slide attachment for an automatically cycling machine tool and selectively capable of controlling the machine cycle or of being controlled by the machine cycle, said attachment comprising a frame member, a slide member reciprocably guided on said frame member, first fixed abutment means coacting directly and positively between said slide and frame members and determining a forward feed position of said slide, second abutment means coacting between said slide and frame members and determining a limiting retraction of said slide member on said frame member, lead-screw feed means for displacing said slide member on said frame member in accordance with lead screw rotation, continuously running drive means, a drive shaft and forward and reverse clutches selectively connecting said drive means to said drive shaft, a torque-limiting clutch connecting said shaft to said lead screw, means for engaging said forward clutch to advance said slide in an in-feeding direction, means responsive to detection of excessive torque by said torque-limiting clutch and disengaging said forward clutch and engaging said reverse clutch, said second abutment means including means disengaging said reverse clutch upon completed retraction of said slide, whereby said torque-limiting clutch will serve not only in cooperation with the positive stop of said first abutment means to determine a precision in-feed limit of travel but also in the presence of unexpected excessive torque (as in a tool-breakage situation) to immediately stop the in-feed and return said slide to fully retracted position in readiness for a complete new recycling of slide movement.

2. The article of claim 1, wherein said means responsive to detection of excessive torque includes delay-operated means operative to engage said reverse clutch after a predetermined interval following disengagement of said forward clutch.

(References on following page)

References Cited in the file of this patent

UNITED STATES PATENTS

| | | |
|---|---|---|
| 300,038 | Bean | June 10, 1884 |
| 1,033,943 | Ruppert | July 30, 1912 |
| 1,340,811 | Ballman | May 18, 1920 |
| 2,170,736 | Stegmeier | Aug. 22, 1939 |
| 2,196,231 | Ridgway | Apr. 9, 1940 |
| 2,250,097 | Groene | July 22, 1941 |
| 2,418,220 | Churchill | Apr. 1, 1947 |
| 2,484,616 | Dulaney | Oct. 11, 1949 |
| 2,520,014 | Rehnberg | Aug. 22, 1950 |
| 2,553,984 | Siekmann | May 22, 1951 |
| 2,556,318 | Cooper | June 12, 1951 |
| 2,558,275 | Siekmann | June 26, 1951 |
| 2,560,238 | Nouzak | July 10, 1951 |
| 2,562,170 | Busemeyer | July 31, 1951 |
| 2,585,215 | Bickel | Feb. 12, 1952 |
| 2,682,941 | Hawley | July 6, 1954 |
| 2,696,581 | Peterson | Dec. 7, 1954 |
| 2,697,373 | Siekmann | Dec. 21, 1954 |
| 2,713,283 | Lomazzo | July 19, 1955 |
| 2,720,129 | De Haas | Oct. 11, 1955 |
| 2,824,637 | Unk | Feb. 25, 1958 |

FOREIGN PATENTS

| | | |
|---|---|---|
| 564,648 | Great Britain | Oct. 6, 1944 |

OTHER REFERENCES

Anchor-Waldron Overload Cut-Outs Catalog 51, copyright 1952.